United States Patent
Fore

[11] Patent Number: 6,023,878
[45] Date of Patent: Feb. 15, 2000

[54] SNAKE TRAP

[76] Inventor: John Fore, 34624 Hwy. 16, Denham Springs, La. 70726

[21] Appl. No.: 09/153,261

[22] Filed: Sep. 14, 1998

[51] Int. Cl.$^7$ ................................................. A01M 23/08
[52] U.S. Cl. ........................................................... 43/61
[58] Field of Search ................................... 43/60, 61, 58

[56] References Cited

U.S. PATENT DOCUMENTS

| | | | |
|---|---|---|---|
| 4,413,439 | 11/1983 | Lindley | 43/61 |
| 4,926,581 | 5/1990 | Grivas | 43/61 |
| 5,107,619 | 4/1992 | Zapata et al. | 43/61 |
| 5,345,710 | 9/1994 | Bitz | 43/61 |
| 5,588,249 | 12/1996 | Flinner | 43/61 |
| 5,778,594 | 7/1998 | Askins et al. | 43/61 |

FOREIGN PATENT DOCUMENTS

| | | | |
|---|---|---|---|
| 2583617 | 12/1986 | France | 43/60 |

*Primary Examiner*—Thomas Price
*Attorney, Agent, or Firm*—Joseph N. Breaux

[57] ABSTRACT

A snake trap including a trap housing defining a trap compartment accessible through a snake entrance opening; an elongated tubular snake entrance tube positioned within the trap compartment having an inlet opening positioned adjacent to the snake entrance opening; and a sliding trap door slidable into a closed position between the snake entrance opening and the inlet end of the elongated snake entrance tube by a triggerable trap door closure mechanism positioned within the trap compartment.

7 Claims, 2 Drawing Sheets

SNAKE TRAP

TECHNICAL FIELD

The present invention relates to animal traps and more particularly to a snake trap including a trap housing defining a trap compartment accessible through a snake entrance opening; an elongated tubular snake entrance tube positioned within the trap compartment having an inlet opening positioned adjacent to the snake entrance opening; and a sliding trap door slidable into a closed position between the snake entrance opening and the inlet end of the elongated snake entrance tube by a triggerable trap door closure mechanism positioned within the trap compartment.

BACKGROUND ART

Snakes can generate fear and can cause injury to people and animals. It would be a benefit, therefore, to have a snake trap that could be used to trap a snake for disposal or release at a distant site. Because captured snakes can cause deadly injuries to animals and individuals, it would be further benefit to have a snake trap that completely contained the captured snake to prevent all contact between the captured snake and other animals and people.

GENERAL SUMMARY DISCUSSION OF INVENTION

It is thus an object of the invention to provide a snake trap that captures snakes within a container housing.

It is a further object of the invention to provide a snake trap that includes an elongated snake entrance tube in connection with a trap compartment to increase the likelihood that the entire snake will enter the trap compartment before the trap door is triggered.

It is a still further object of the invention to provide a snake trap that includes a light opening that provides a light entranceway into the trap compartment from a source other than the snake entrance opening to provide confidence to the snake that an escape pathway exists.

It is a still further object of the invention to provide a snake trap that includes a trap housing defining a trap compartment accessible through a snake entrance opening; an elongated tubular snake entrance tube positioned within the trap compartment having an inlet opening positioned adjacent to the snake entrance opening; and a sliding trap door slidable into a closed position between the snake entrance opening and the inlet end of the elongated snake entrance tube by a triggerable trap door closure mechanism positioned within the trap compartment.

It is a still further object of the invention to provide a snake trap that accomplishes some or all of the above objects in combination.

Accordingly, a snake trap is provided. The snake trap includes a trap housing defining a trap compartment accessible through a snake entrance opening; an elongated tubular snake entrance tube positioned within the trap compartment having an inlet opening positioned adjacent to the snake entrance opening; and a sliding trap door slidable into a closed position between the snake entrance opening and the inlet end of the elongated snake entrance tube by a triggerable trap door closure mechanism positioned within the trap compartment. In a preferred embodiment the triggerable trap door closure mechanism includes a mouse trap having an elongated trigger arm attached to the existing trigger element of the mouse trap and a flexible connecting link connected between the trap door and the spring powered, U-shaped force mechanism of the triggerable trap door closure mechanism. In another preferred embodiment the trap housing is provided with a light inlet, such as a window or number of small slits or holes, through which light can enter the trap compartment to trick the snake into believing a second escape pathway exists from the housing. In still another preferred embodiment, a compartment for retaining snake attractants such as live bait, including baby chicks and mice in cages, is provided. Additional preferred embodiments include decoy attractants, such as simulated eggs covered or filled with a snake attractant such as rodent urine or quail scent.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
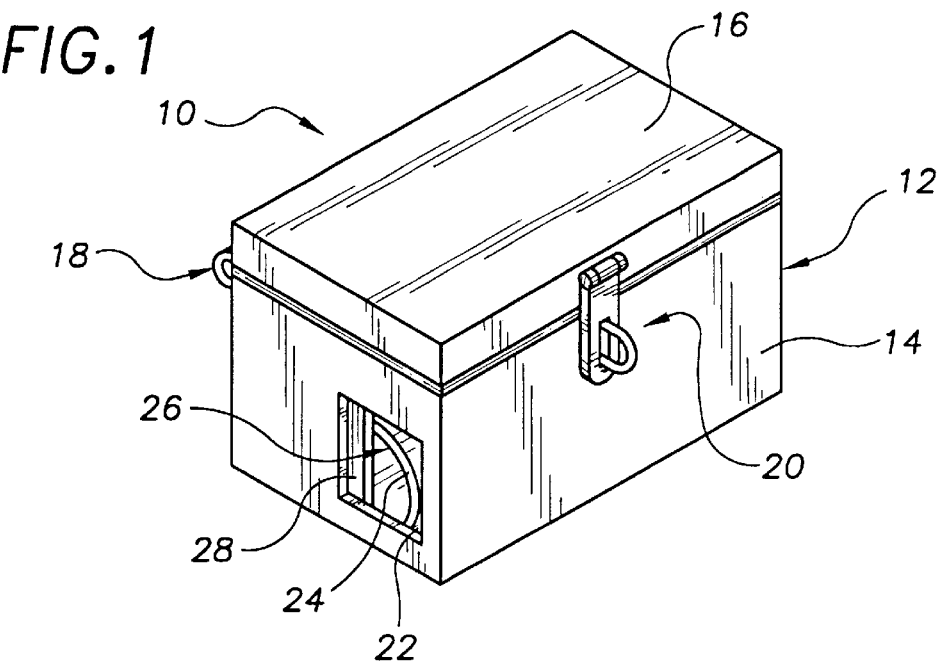
FIG. 1 is a perspective view of an exemplary embodiment of the snake trap of the present invention showing the trap housing including the hinged lid, the locking clasp and the snake entrance opening; the inlet end of the elongated tubular snake entrance tube; and the sliding trap door in the open position.
Figure 2:
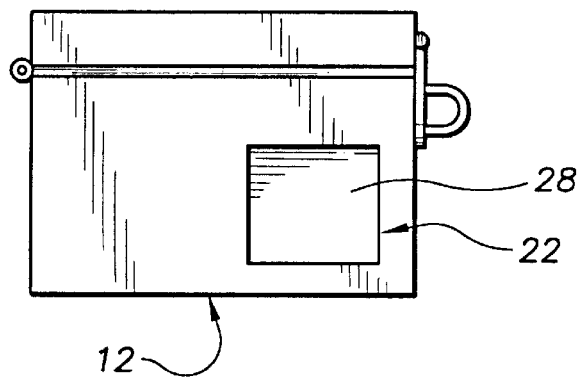
FIG. 2 is front plan view showing the snake trap of FIG. 1 with the sliding trap door in the closed position covering the snake entrance opening and the inlet end of the elongated tubular snake entrance tube.

FIG. 1 shows an exemplary embodiment of the snake trap of the present invention, generally designated 10. Snake trap 10 includes a plastic trap housing, generally designated 12, including a lower portion 14 and a lid 16 that is connected to lower portion 14 with a hinge 18. Lid 16 is held in the closed position with hasp assembly 20 which can be locked with a stick or bolt and if desired with a conventional padlock. Lower portion 14 has a rectangular snake entrance opening 22 defined therethrough having an inlet end 24 of an elongated tubular snake entrance tube, generally designated 26, positioned adjacent thereto. A sliding trap door 28 is slidable, referring now to FIG. 2, between snake entrance opening 22 and inlet end 24 to seal trap housing 12.

Figure 3:
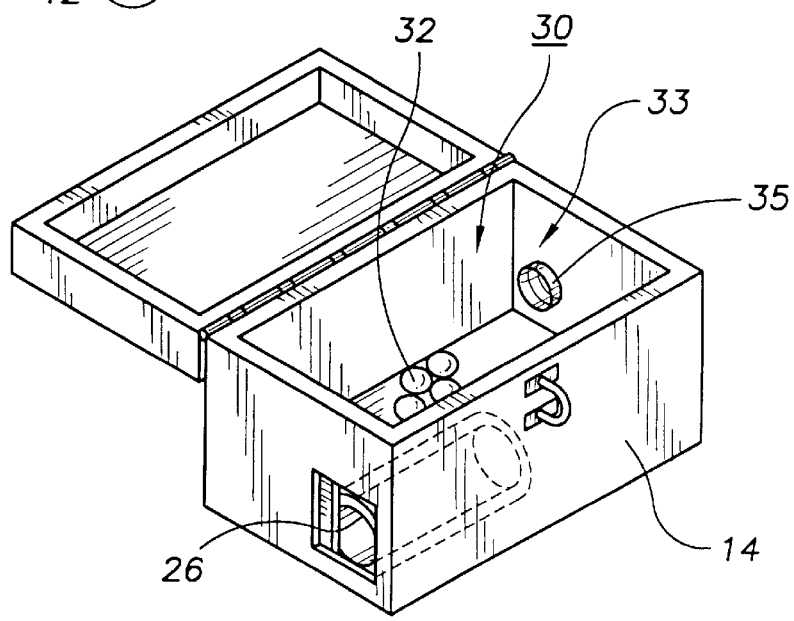
FIG. 3 is a perspective view of the snake trap of FIG. 1 with the hinged lid in the open position showing the internal trap compartment, the optional trap compartment light entrance window and four optional replica bird eggs filled or covered with a snake attractant scent.
Figure 4:
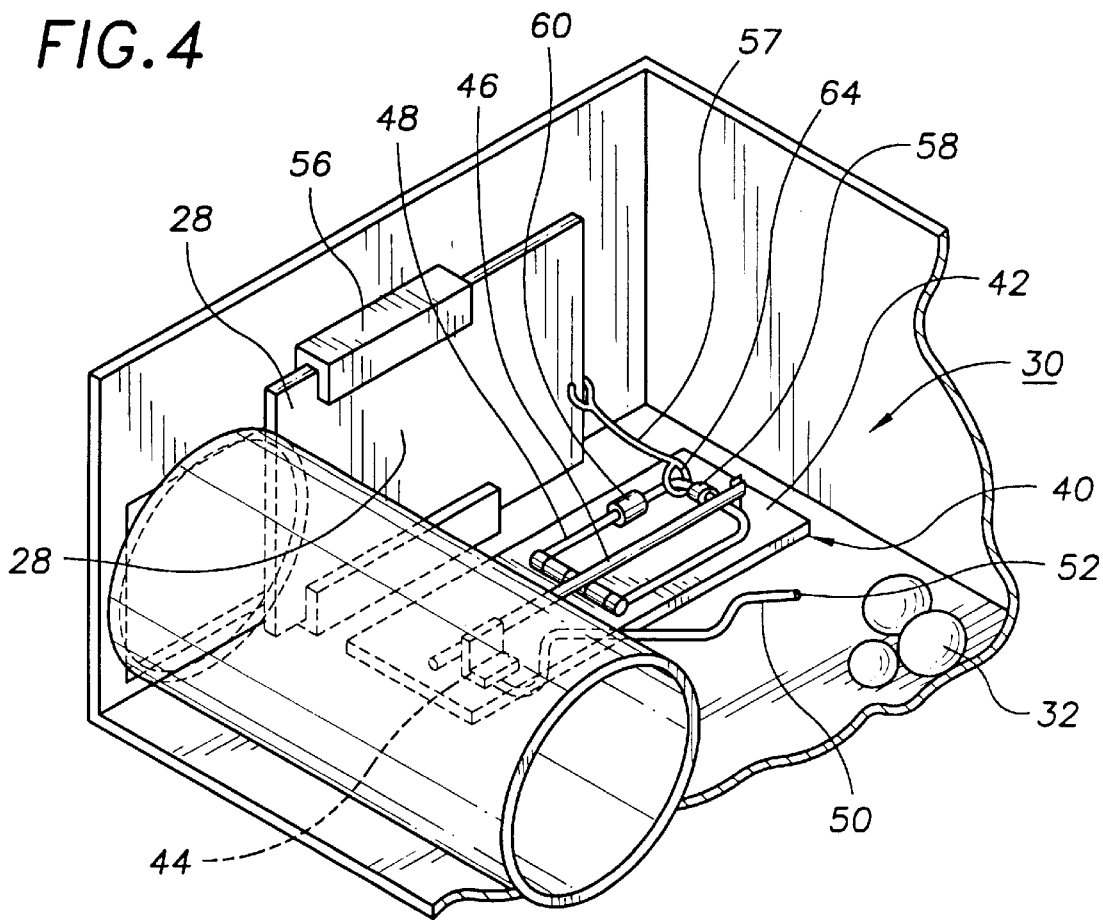
FIG. 4 is a partial perspective view of the trap compartment showing the triggerable trap door closure mechanism in the cocked configuration with the elongated trigger arm extending outwardly into the trap compartment; the sliding trap door in the open position slidably trapped by a pair of trap door guides and attached to the spring powered, U-shaped force mechanism of the triggerable trap door closure mechanism with a flexible connecting link; three snake attractant filled egg decoys position in proximity to the end of the elongated trigger arm; and the elongated tubular snake entrance tube.

Referring now to FIG. 3, lower portion 14 has a trap compartment 30 defined therein and a light inlet 33 in connection with trap compartment 30 that is covered by a transparent plastic pane 35. In this embodiment a number of plastic simulated quail eggs 32 imbued with quail scent are positioned within trap compartment 30 as a lure for enticing snakes through elongated snake entrance tube 26 into trap compartment 30. Elongated snake entrance tube 26 is selected to be at least four inches, in this embodiment eight inches, to require a good portion of the snake to enter trap compartment 30 before it is possible, with reference now to FIG. 4, for a snake to trigger a triggerable trap door closure mechanism, generally designated 40, positioned within trap compartment 30. Triggerable trap door closure mechanism 40 is a conventional mouse trap, designated 42, including a trigger element 44, a retaining arm 46, and a spring powered, U-shaped force mechanism 48. An elongated trigger arm 50 is secured to trigger element 44 and has an end 52 extending to the location of the simulated quail eggs 32.

Figure 5:
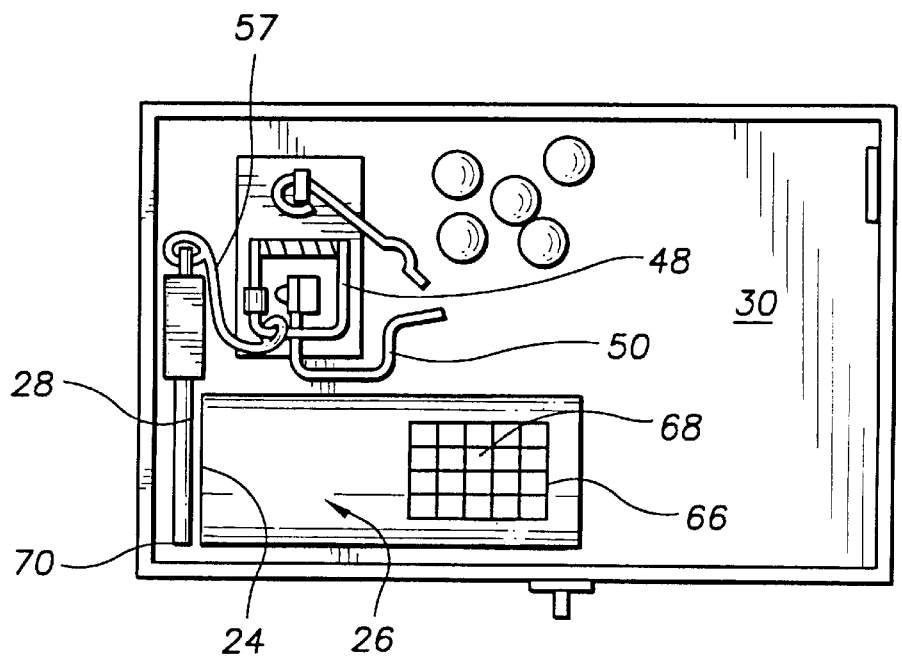
FIG. 5 is a top plan view of the interior of the trap compartment showing the triggerable trap door closure mechanism in the fired configuration with spring powered, U-shaped force mechanism released by the force mechanism retaining arm and biased forward by the force spring toward a fired position causing sliding trap door to move into and remain biased toward the closed position positioned located and blocking the snake entrance opening and the inlet end of the snake entrance tube.

Sliding trap door 28 is slidingly entrapped by a guide member 56 and is connected to spring powered, U-shaped force element 48 by a flexible connecting link 57. Two stops 58,60 are provided on spring powered, U-shaped force element 48. Travel of a first end 64 of flexible connecting link 57 is restricted between stops 58,60. Referring to FIG. 5, a snake entering trap compartment 30 contacts trigger arm 50 releasing spring powered, U-shaped force element 48 causing it to rotate toward the sprung position. As spring powered, U-shaped force element 48 pivots, connecting link 57 pulls sliding trap door 28 into the closed position located between snake entrance opening 22 (FIG. 1) and inlet end 24 of elongated snake entrance tube 26. The length of flexible connecting link 57 is selected such that a forward door edge 70 of sliding trap door 28 reaches its completely closed position before spring powered, U-shaped force element 48 reaches its fully sprung position causing sliding trap door 28 to remain biased toward the closed position by the spring force from spring powered, U-shaped force element 48. In this embodiment, a live animal lure cage 66 is provided atop elongated snake entrance tube 26 should a user to desire to utilize a live attractant, such as a live mouse 68, to attract a snake.

It can be seen from the preceding description that a snake trap has been provided that captures snakes within a container housing; that includes an elongated snake entrance tube in connection with a trap compartment to increase the likelihood that the entire snake will enter the trap compartment before the trap door is triggered; that includes a light opening that provides a light entranceway into the trap compartment from a source other than the snake entrance opening to provide confidence to the snake that an escape pathway exists; and that includes a trap housing defining a trap compartment accessible through a snake entrance opening; an elongated tubular snake entrance tube positioned within the trap compartment having an inlet opening positioned adjacent to the snake entrance opening; and a sliding trap door slidable into a closed position between the snake entrance opening and the inlet end of the elongated snake entrance tube by a triggerable trap door closure mechanism portioned within the trap compartment.

It is noted that the embodiment of the snake trap described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A snake trap comprising:

a trap housing defining a trap compartment accessible through a snake entrance opening;

an elongated tubular snake entrance tube of a length greater than four inches positioned within the trap compartment having an inlet opening positioned adjacent to the snake entrance opening; and a sliding trap door slidable into a closed position between the snake entrance opening and the inlet end of the elongated snake entrance tube by a triggerable trap door closure mechanism positioned within said trap compartment.

2. The snake trap of claim 1 further including:

a second light inlet into said trap compartment.

3. The snake trap of claim 2 wherein:

said light inlet is an opening covered by a transparent pane.

4. The snake trap of claim 1 further including:

a live lure compartment is provided within said trap compartment for retaining live animal snake attractants.

5. The snake trap of claim 1 further including:

decoy attractants positioned within the trap compartment.

6. The snake trap of claim 5 further including:

said decoy attractant is a simulated egg imbued with a snake attractant scent.

7. The snake trap of claim 1 wherein:

said triggerable trap door closure mechanism includes a mouse trap having a trigger element, a retaining arm, and a spring powered, U-shaped force mechanism; said retaining arm being placed in connection with said trigger element in a manner to retain said spring powered, U-shaped force element in a cocked position; said trigger element having an elongated trigger arm attached thereto and extending into said trap compartment; said spring powered, U-shaped force element being connected to said sliding trap door with a flexible connecting link.

* * * * *